Patented Apr. 19, 1927.

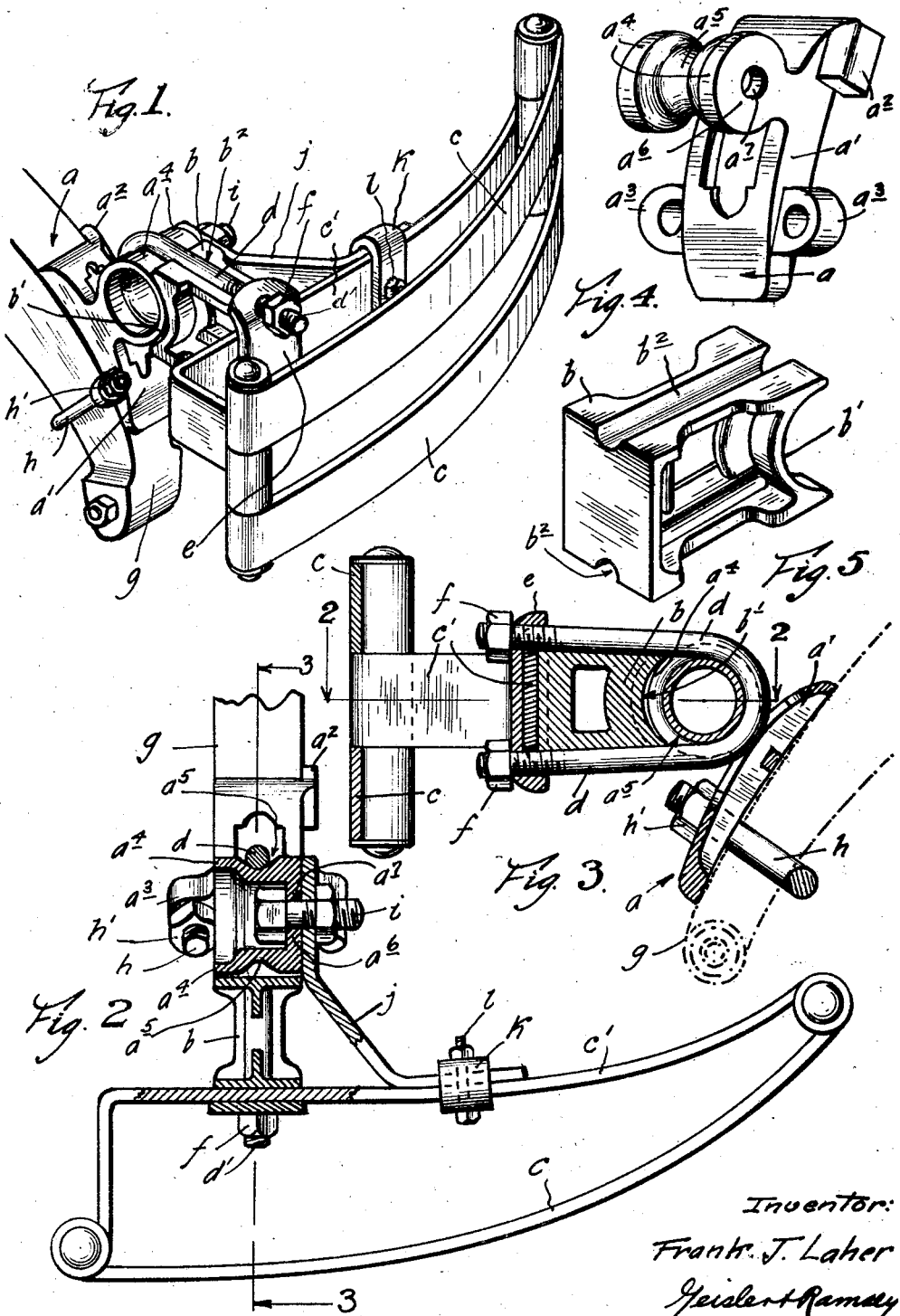

1,625,550

UNITED STATES PATENT OFFICE.

FRANK J. LAHER, OF PORTLAND, OREGON.

VEHICLE BUMPER.

Application filed December 29, 1925. Serial No. 78,126.

My invention relates to vehicle bumpers, and especially to those small bumpers referred to in the trade as "bumperettes," which are small bumpers arranged to extend across one of the rear fenders only. Said bumpers are fastened only at their inner ends to the rear ends of the frame sides of the vehicle. Being fastened in this manner, the connections therefor are necessarily extremely sturdy and rigid to sustain the blows received. This is especially so because said "bumperettes" ordinarily are struck at their outer extremities, and the blows thus received tend to twist them about their supports. Said connections must thus be adapted to sustain considerable twisting action, as well as straight shocks.

The object of my invention, therefore, is to provide a vehicle bumper mounting of this character which is easily fastened to the ends of the frame sides, which readily conforms thereto, and which seats firmly thereon to resist lateral displacement.

An object of my invention, also, is to provide a bumper mounting of this character which is arranged to permit the bumper to be adjusted in a vertical plane, and in this manner to permit the bumpers at the opposite sides of the car to be alined with each other.

A further object of my invention is to provide in bumpers of this character, a rigid and sturdy brace, for the outer or unsupported portion of said bumper but which will not interfere in any way with the adjusting means of the bumper.

Further details of construction and the manner of mounting said bumper are hereinafter described with reference to the accompanied drawings, in which:

Fig. 1 shows a perspective view of a bumper supported by my improved mounting upon the end of one of the frame sides of a vehicle;

Fig. 2 is substantially a plan view of the structure shown in Fig. 1, taken on the line 2—2 in Fig. 3;

Fig. 3 is a section taken on the line 3—3 in Fig. 2 through the mounting, and the bumper supported thereby;

Fig. 4 is a perspective view of the base of said mounting; and

Fig. 5 is a perspective view of the pivoted arm which supports the bumper bar.

My improved bumper mounting comprises a base $a$, an arm portion $b$, pivotally supported thereby and supporting the bumper bars $c$ of said bumper by a U-bolt $d$. The threaded ends $d'$ of said U-bolt are passed through a clip $e$, which partially encompasses the spring bar $c'$, as is shown in Fig. 3. Nuts $f$ on said U-bolt hold said structure in place.

The body $a'$ of said base is curved to conform generally to the end of the frame side $g$ of the vehicle, as is shown in Fig. 3. The under surface of said body is curved upon a slightly lesser arc, and thus the fastening U-bolt $h$ which holds said base to said frame, tends to flatten said body. Said body is preferably slightly resilient, so as to permit said flexure. When the nuts $h'$ on said U-bolt are drawn tight, the reflex action of said base tends to prevent said nuts from backing off under the vibration of the vehicle.

Said base $a$ is provided with an overhanging pendent lip $a^2$, which extends downwardly along one edge of the frame side as shown in Fig. 1. Said over-hanging pendent lip $a^2$ is integral with said body and thus tends to prevent the latter from shifting laterally upon said frame side.

Apertured ears $a^3$ on said body, through which the ends of the U-bolt $h$ pass, are arranged at one end of said body and said lip is arranged at the opposite end. Said U-bolt $h$ and said lip thus serve mutually to hold said base against lateral displacement.

Built up from said body $a'$ is a hub-like section $a^4$, integral with said body and provided with a central portion $a^5$, which is of lesser diameter than the remainder and thus serves as a circumferential recess in which the bolt $d$ is seated.

The inner end $b'$ of the arm $b$ is provided with a pocket which conforms in curvature to said hub $a^4$ and thus when the nuts of the U-bolt $d$ are slackened off, said arm $b$ is permitted to pivot about said hub $a^4$. Said arm $b$ is provided with longitudinal grooves $b^2$ at each side in which the leg portions of said U-bolt $d$ are seated.

Said hub $a^4$ is hollow, as shown in Fig. 2, but is provided with an end wall $a^6$ through which an axial hole $a^7$ is made. A pivot bolt $i$ is passed through said hole $a^7$ and fastens one end of a brace $j$ to said hub. The opposite end of said brace $j$ is fastened to the spring bar $c'$ of the bumper bars by the clip $k$, held in place by a bolt *l*. Said brace *j* is fastened to the bumper bars at approximately their middle, and inasmuch as the arm *b* is firmly fastened to their inner ends, said brace and said arm thus form spaced supports for said fender portion which are adapted to resist blows imposed upon the outer end of said fender portion.

I claim:

1. In a vehicle bumper, a base having a hub-like portion projecting therefrom, an arm rotatably mounted thereon, a bumper bar carried at one end by said arm, a brace fastened to said bumper bar, at its middle, a pivot bolt arranged axially of said hub-like portion, fastening said brace to said portion of said base.

2. In a vehicle bumper, a base having a hub-like portion projecting therefrom, an arm rotatably mounted thereon, a bumper bar carried at one end by said arm, a brace fastened to said bumper bar, at its middle, a pivotal connection arranged axially of said hub-like portion, fastening said brace to said portion of said base.

3. In a vehicle bumper, a base having a hub-like portion projecting therefrom, an arm rotatably mounted thereon, a bumper bar carried at one end by said arm, a brace fastened to said bumper bar, at its middle, a pivotal connection arranged axially of said hub-like portion, fastening said brace to said portion of said base, said base provided at one end with means adapted for encompassing one end of a frame side of a vehicle and at the opposite end with a pendent lip adapted to engage the side of said frame side.

4. In a vehicle bumper, a brace having a hub-like portion projecting therefrom, an arm rotatably mounted thereon, a bumper bar carried at one end by said arm, a brace fastened to said bumper bar, at its middle, a pivotal connection arranged axially of said hub-like portion, fastening said brace to said portion of said base, said base provided at one end with means adapted for encompassing one end of a frame side of a vehicle and at the opposite end with a pendent lip adapted to engage the side of said frame side, said lip being arranged at the same side of the base as the pivotal connection for said frame, thereby to hold said base against lateral displacement.

5. In a vehicle bumper, a mounting comprising a base composed of a body portion, outstanding fastening devices at one end thereof, an overhanging pendent frame engaging lip at the other end and an upstanding hub-like supporting portion adjacent said lip.

6. In a vehicle bumper, a mounting comprising a base composed of a body portion, outstanding apertured ears at one end thereof, an overhanging pendent frame engaging lip at the other end and an upstanding hub-like supporting portion adjacent said lip.

7. In a vehicle bumper, a mounting comprising a base composed of a body portion, outstanding fastening devices at one end thereof, an overhanging pendent frame engaging lip at the other end, and an upstanding hub-like supporting portion adjacent said lip, said hub-like portion being hollow and having a side wall provided with an axial pivot hole.

8. In a vehicle bumper, a base adapted to be set upon the frame end of a vehicle, said base being resilient and having a concaved bottom means for drawing said base towards the vehicle frame upon which it is mounted to flatten said concave portion and flex said base.

9. In a vehicle bumper, a base adapted to be set upon the frame end of a vehicle, said base being resilient and having a concaved bottom means for drawing said base towards the vehicle frame upon which it is mounted to flatten said concave portion and flex said base, said base being provided with fastening means at one end, and an overhanging pendent lip at the other, said lip being located at one side of said base thereby adapted to engage the frame upon which said base is mounted.

10. In a vehicle bumper, a base adapted to be set upon the frame end of a vehicle, said base being provided with fastening means at one end, and an overhanging pendent lip at the other, said lip being located at one side of said base thereby adapted to engage the frame upon which said base is mounted, a cylindrical hub portion carried by said base, an arm pivotally carried by said hub portion, a bumper bar carried by said arm, and a brace fastened to the middle of said fender section, and pivotally connected to said hub.

FRANK J. LAHER.